Nov. 6, 1928.
J. R. SNYDER
SHOCK ABSORBER
Original Filed Aug. 9, 1924
1,690,257
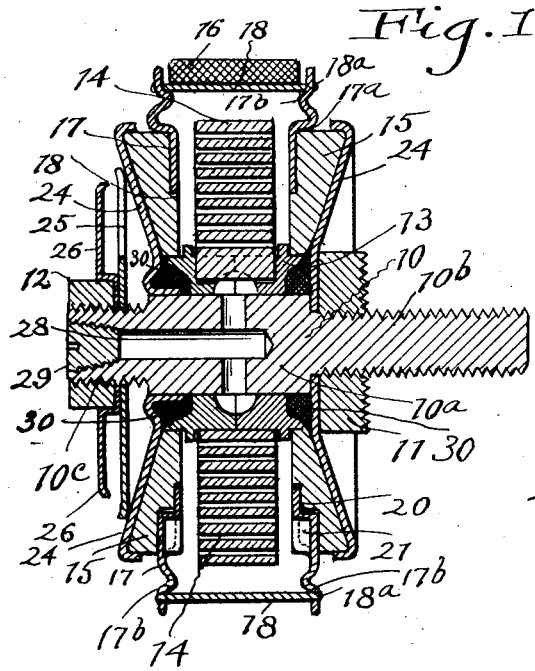
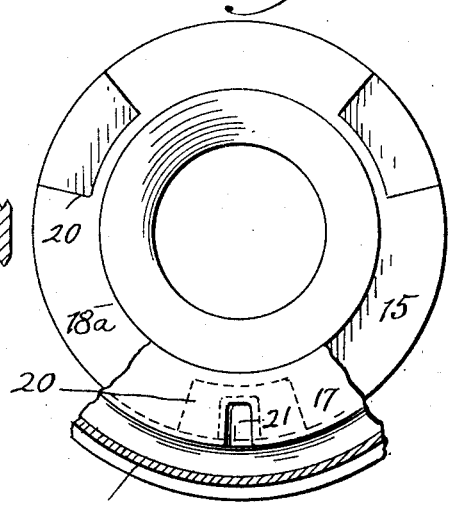
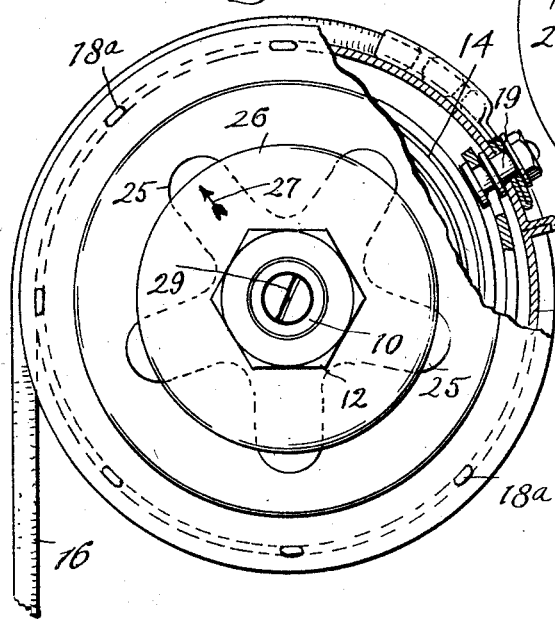
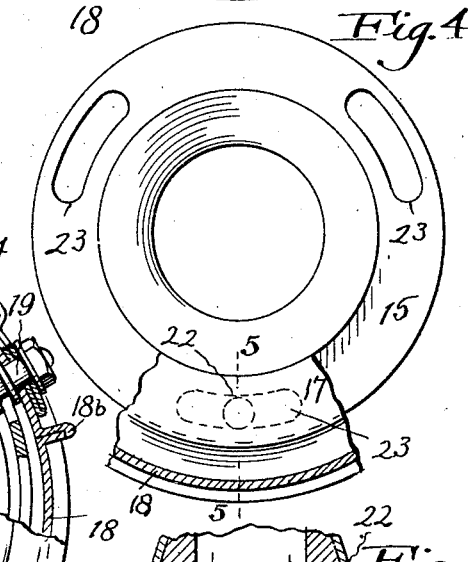
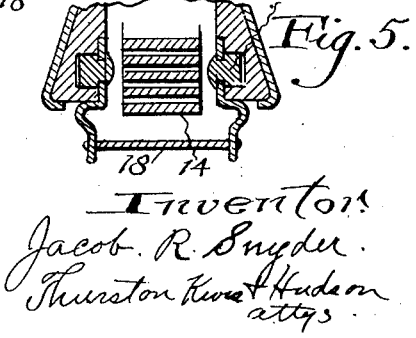

Patented Nov. 6, 1928.

1,690,257

UNITED STATES PATENT OFFICE.

JACOB R. SNYDER, OF CLEVELAND, OHIO, ASSIGNOR TO THE STAR REBOUND CONTROLLER COMPANY, OF CLEVELAND, OHIO, A CORPORATION OF OHIO.

SHOCK ABSORBER.

Original application filed August 9, 1924, Serial No. 731,014. Divided and this application filed August 9, 1924, Serial No. 731,015. Renewed March 31, 1928.

This invention relates to shock absorbers adapted particularly for use on motor vehicles to check the rebound following the compression stroke of the main spring.

More particularly the invention relates to shock absorbers of the frictionally retarded type wherein there is a frictionally retarded drum onto which a strap or belt is wound on the compression stroke of the main springs, and from which it is unwound during the rebound movement.

A shock absorber of this general type is illustrated in my prior Patent No. 1,502,755, granted July 29, 1924, but in these shock obsorbers as heretofore marketed, all movements of the drum in both directions are frictionally retarded, this being generally accomplished as in my prior patent, referred to, by the use of a one-piece drum, preferably of oil impregnated wood, and a pair of friction disks which yieldingly engage opposite sides of the drum and bear against the same with predetermined pressure which can be adjusted at will to vary the friction or retarding action.

The principal object of the present invention is to provide a construction wherein there is a neutral zone in the sense that the drum may have a predetermined rotation before the friction means takes effect, thus permitting minor relative movements between the car body and axle to take place without being influenced by the shock absorber.

The present application is a division of an application, Serial No. 731,014, filed by me, said application illustrating certain novel features of a shock absorber of this general type in different forms or embodiments, one of which is specifically claimed herein.

It is a feature of the present invention that a composite drum is utilized, composed of one or more parts engaged by the friction means, and another part which is engaged by the strap, a predetermined free relative movement being permitted between these members before an engagement takes place which causes the movement of one to be transmitted to the other.

The invention may be further briefly summarized as consisting in certain novel details of construction, and combinations and arrangements of parts which will be described in the specification and set forth in the appended claims.

In the accompanying sheet of drawings illustrating the preferred embodiment and a slight modification, Fig. 1 is a sectional view of the improved shock absorber; Fig. 2 is a side elevation with parts in section; Fig. 3 is a view looking at the inner side of the drum with parts broken away; Fig. 4 is a similar view showing a modification; and Fig. 5 is a sectional view substantially along the line 5—5 of Fig. 4, showing a portion only of the device.

Referring now to the drawings, 10 represents a stationary center bolt having in this instance an enlarged middle portion $10^a$, preferably hexagonal in section, and at one side of the same a threaded reduced portion $10^b$ which receives a nut 11 and adapted to receive also a fitting by which the shock absorber may be attached to the chassis frame of a vehicle. At the opposite side of the enlarged middle portion $10^a$ is a threaded portion $10^c$, which receives a nut 12, to be referred to presently. Fitted onto the enlarged middle portion $10^a$ of the center bolt is a non-rotatable collar 13 which is preferably formed in two halves for convenience in assembly. This collar serves as a support for the spiral spring 14, the inner end of the spring being received in a slot or notch of the collar or being otherwise secured thereto so as to be held stationary. Additionally this collar 13 serves as one of the supports or bearings for the drum, which in this case is hollow and houses the spring 14, the drum being composed of two inner members 15, preferably of oil impregnated wood or self-lubricating material and an outer metal portion which receives a strap 16. The outer metal portion may be formed in one piece or in two or three pieces, but preferably is composed of two side members 17, and an outer band 18 which extends between the side members and is secured thereto, the strap 16 being connected to this band 18. The band 18 is preferably secured to the members 17 by providing on its edges lugs $18^a$ which are extended through openings in the members 17 and by upsetting these lugs.

The two members 17 which are preferably in the form of metal disks punched from sheet metal, extend inwardly along the inner sides of the wooden side members 15 and their inner peripheries engage shoulders $18^a$ formed on the inner sides of the members 15.

Additionally, the disks 17 are preferably given a compound curve between the wooden disks and the band 18; that is to say, they curve outwardly to form annular seats or shoulders 17ª which engage the peripheral portions of the wooden disks or side members 15; then they curve inwardly and then again outwardly to form annular seats or shoulders 17ᵇ for the band 18. With this construction the outer metallic portion of the drum has a good bearing or seat on the inner or wooden portions and practically an oiltight construction is provided where the band 18 is united to the disks 17 so as to prevent the loss of lubricant, as more fully explained in my prior application referred to above.

The band 18 may be formed from a strap of metal, the ends of which are preferably united by bending them outwardly and welding them together, forming an outstanding protuberance 18ᵇ (shown in Fig. 2).

The outer end of spring 14 and the inner end of strap 16 can be secured to the band 18 of the drum by a single bolt or equivalent device 19, the protuberance 18ᵇ serving to prevent the strap 16 being fastened to the bolt and extended around the drum in the wrong direction.

The metal disks 17 are not positively or rigidly fastened to the wooden disks 15, but are capable of rotating a predetermined amount relatively to the latter, the frictional engagement between the parts permitting this predetermined relative movement when the shock absorber is in action. However, after this predetermined relative movement or predetermined free and unretarded movement of the outer metallic portion of the drum takes place, it is desirable that the parts be locked together so as to move in unison. This result can be accomplished in different ways, as for example, by providing on the inner sides of the wooden disks 15, preferably at a plurality of points in each of them, arc shaped notches or slots 20 and by depressing the metal disks 17 to form outwardly extending shoulders 21 of less arcuate extent than the notches 20, which shoulders extend into the notches as illustrated in Figs. 1 and 3. Obviously the outer metal portion of the drum can be turned relative to the inner wooden portion in either direction from the center position, until the shoulders 21 engage the shoulders formed by the ends of the notches 20, and after this occurs the movement of the outer portion of the drum will be transmitted to the inner portion.

Instead of forming the shoulders 21 by pressing the metal outward, these shoulders could be formed by attaching suitable shoulder forming pieces to the outer sides of the disks 17, as for example, studs 22 adapted to extend into arc shaped slots 23 of the wooden disks.

The drum is designed to be frictionally retarded by stationary metal disks 24 which engage the outer sides of the wooden disk 15 and extend inwardly for a distance over their peripheries so as to exclude dirt, dust and the like from their engaging surfaces. The right hand disk 24 (as the device is viewed in Fig. 1) is clamped between the nut 11 and a shoulder of the center bolt; the other disk 24 is in sliding engagement with the enlarged middle portion of the center bolt 10ª and is pressed yieldingly inward against the adjacent wooden disk 15 so as to press the opposite wooden disk 15 against the adjacent friction disk 24 by means of an adjustable spring preferably in the form of a star spring 25, the tension of which can be adjusted by the nut 12 which is screwed onto the end 10ᶜ of the center bolt, as previously explained. The inner part of this friction disk may be flanged inwardly to form an extended bearing or seat on the non-circular middle portion 10ª of the center bolt so as to minimize back lash or play.

A disk 26 which is between the star spring and nut 12 conceals the major portion of the star spring, the center part of the disk 26 being preferably cupped to receive the nut 12 so that it will turn with the nut. By providing disk 26 with an indicating mark such as shown at 27 in Fig. 2, the position of this disk shown by the position of indicator 27 will indicate the tension which is imposed in the star spring 25.

Lubricant can be supplied to the inner portion of the drum through a passageway 28 in the center bolt, this passageway being normally closed by a plug 29. Lubricant may pass from this passageway through the collar 13 into the drum. To prevent loss of lubricant around the inner part of the drum, felt washers 30 may be provided between the collar 13 and the friction disks 24, substantially as shown in Fig. 1.

When the shock absorber is applied to a vehicle the center bolt 10 is secured to the chassis frame and the outer end of the belt or strap 16 is suitably secured to the axle, so that during the compression stroke of the main springs of the vehicle the spiral spring 14 will turn the drum so as to wind the strap 16 thereon and keep it taut. On the subsequent rebound stroke the strap 16 is pulled out or unwound from the drum, this being resisted by the spring 14, and by the friction imposed by the friction disks 24. However, with the present construction minor vibrations may occur, as when the vehicle is running over a smooth or fairly smooth road without bringing the friction retarding means into action since the outer part of the drum to which the spring 14 and strap 16 are connected is capable of a given rotation before the movement of the outer part of the drum is imparted to the inner part which is engaged by the friction members. But when the relative movement between the car body and axle exceeds a predetermined amount, as when the wheels strike an obstacle or drop into a depression, further rotation of the outer part of the drum beyond the permitted free rotation causes the inner portion or wooden disks to be rotated, and brings the friction retarding feature into action.

As far as I am aware, I am the first to provide in a friction retarded shock absorber of this general type, the so-called neutral zone. Therefore this feature is claimed broadly herein.

I do not desire to be confined to the exact details shown, but aim in my claims to cover all modifications which do not involve a departure from the spirit and scope of my invention as defined in the appended claims.

Having described my invention, I claim:

1. A shock absorber comprising a drum, a strap engaging the same, the drum having a portion which is rotatable in opposite directions and whose movement is frictionally resisted and with respect to which the strap engaged portion of the drum is capable of a limited free movement.

2. A shock absorber comprising a drum composed of a portion engaged by a spring to rotate it in one direction and by a strap to rotate it in the opposite direction, and a frictionally retarded portion rotatable in opposite directions by and having a lost motion connection with the first mentioned portion.

3. A shock absorber comprising a drum having a frictionally retarded inner portion having a lost motion connection with an outer portion for rotating it in opposite directions, and a spring and strap engaging the outer portion.

4. A shock absorber comprising a portion composed of self-lubricating material, a friction member engaging it, a metallic portion having a lost motion connection with the first portion for rotating it in opposite directions, and a spring and strap engaging the metallic portion.

5. A shock absorber comprising a rotatable drum composed of a pair of spaced inner frictionally retarded members, and an outer portion having a lost motion connection with the inner members for rotating them in opposite directions, and a spring and strap engaging the outer portion.

6. A shock absorber comprising a hollow drum composed of a pair of spaced members of self-lubricating material, an outer metallic portion having a lost motion connection therewith, friction means engaging the inner portion, a spring within the drum and connected to the metallic portion, and a strap engaging the periphery of the metallic portion.

In testimony whereof, I hereunto affix my signature.

JACOB R. SNYDER.